United States Patent
Klinger et al.

(10) Patent No.: US 11,689,428 B1
(45) Date of Patent: *Jun. 27, 2023

(54) SYSTEMS AND METHODS FOR VISUALIZATION BASED ON HISTORICAL NETWORK TRAFFIC AND FUTURE PROJECTION OF INFRASTRUCTURE ASSETS

(71) Applicant: Fannie Mae, Washington, DC (US)

(72) Inventors: Ronald Klinger, Washington, DC (US); Bijal Shah, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/509,794

(22) Filed: Oct. 25, 2021

Related U.S. Application Data (63) Continuation of application No. 16/519,930, filed on Jul. 23, 2019, now Pat. No. 11,159,387.

(51) Int. Cl.
  *G06F 15/173*  (2006.01)
  *H04L 41/147*  (2022.01)
  *G06N 3/04*  (2023.01)
  *H04L 41/22*  (2022.01)
  *G06N 3/08*  (2023.01)
  *H04L 43/04*  (2022.01)
  *G06N 3/10*  (2006.01)

(52) U.S. Cl.
  CPC ............. *H04L 41/147* (2013.01); *G06N 3/04* (2013.01); *G06N 3/08* (2013.01); *G06N 3/10* (2013.01); *H04L 41/22* (2013.01); *H04L 43/04* (2013.01)

(58) Field of Classification Search
  None
  See application file for complete search history.

(56) References Cited

U.S. PATENT DOCUMENTS

| | | |
|---|---|---|
| 2005/0267928 A1 | 12/2005 | Anderson et al. |
| 2008/0162390 A1 | 7/2008 | Kapoor et al. |
| 2011/0238855 A1 | 9/2011 | Korsunsky et al. |
| 2015/0244775 A1* | 8/2015 | Vibhor ................ G06F 11/0772 709/203 |

\* cited by examiner

*Primary Examiner* — Wing F Chan
*Assistant Examiner* — Andrew Woo
(74) *Attorney, Agent, or Firm* — Foley & Lardner LLP (57) ABSTRACT

Disclosed herein are systems, methods, and storage media for network traffic projection and visualization. A computing system includes at least one circuit structured to receive network traffic data. A neural network is generated based on the network traffic data and includes a network traffic projection. The network traffic projection is displayed, via a graphical user interface, to a system administrator. In some embodiments, the computing system includes at least one circuit structured to receive change management data, such as application- and outage-related information. The change management data is combined with the network traffic projection data in a change window simulator, which recommends one or more change windows.

20 Claims, 4 Drawing Sheets

SYSTEMS AND METHODS FOR VISUALIZATION BASED ON HISTORICAL NETWORK TRAFFIC AND FUTURE PROJECTION OF INFRASTRUCTURE ASSETS

CROSS-REFERENCE TO RELATED APPLICATION

This application is a continuation of and claims priority to U.S. patent application Ser. No. 16/519,930, filed Jul. 23, 2019, now U.S. Pat. No. 11,159,387, entitled "Systems and Methods for Visualization Based on Historical Network Traffic and Future Projection of Infrastructure Assets," which is incorporated herein by reference in its entirety and for all purposes.

TECHNICAL FIELD

The present disclosure relates generally to systems for network traffic management and change management. In particular, the present disclosure relates to systems and methods for visualization of network traffic based on historical network traffic and future projection of infrastructure assets.

BACKGROUND

Change management in enterprise systems is a process for scheduling and carrying out system maintenance activities, such as patching, updates, and new releases. Change management activities typically require system downtime, which needs to be carefully planned so as to minimize disruption to enterprise operations, upstream systems, and downstream systems.

SUMMARY

One set of embodiments relates to a network traffic projection and visualization computing system. The system comprises at least one processor and memory. The memory comprises computer-executable instructions, the instructions, when executed by the at least one processor, operable to receive network traffic data comprising a source host and a destination host, generate a neural network comprising a network traffic projection based on the network traffic data, and display, via a graphical user interface of a system administrator device, the network traffic projection.

In some embodiments, the memory further comprises instructions that, when executed by the at least one processor, are operable to receive change management data, comprising at least one of an application associated with one of the source host and the destination host, a planned outage description, and a planned outage duration, receive, via the graphical user interface, a user input indicative of a parameter for the network traffic projection, wherein the parameter includes the change management data, and display, via the graphical user interface, an updated network traffic projection reflective of a subset of network traffic data corresponding to the parameter.

In some embodiments, the memory further comprises instructions that, when executed by the at least one processor, are operable to determine a disruption factor for a subset of change management data associated with at least one of the source host or the target host. In some embodiments, the disruption factor is based on a total number of bytes of traffic between the source host and the destination host. In some embodiments, the disruption factor is further based on CPU utilization of at least one of the source host and the destination host. In some embodiments, the disruption factor is further based on memory utilization of at least one of the source host and the destination host. In some embodiments, the disruption factor is based on projected traffic activity between the source host, the destination host and at least one other host device.

In some embodiments, the graphical user interface comprises a change window simulator. In some embodiments, the memory further comprises instructions that, when executed by the at least one processor, are operable to cause the change window simulator to display a set of change windows determined based on the network traffic projection, wherein each change window corresponds to at least one of the source host and the destination host. In some embodiments, the memory further comprises instructions that, when executed by the at least one processor, are operable to, responsive to detecting a user input indicative of the parameter for the network traffic projection, cause the change window simulator to display an updated set of change windows determined based on the network traffic projection and the parameter. In some embodiments, each change window is determined based on at least one of projected number of bytes transferred, projected CPU utilization, and projected memory utilization.

In some embodiments, the memory further comprises instructions that, when executed by the at least one processor, are operable to, based on the network traffic data, generate a binary-formatted network traffic activity resource comprising a string of characters indicative of network traffic activity between the source host and the destination host for a particular time period, and generate the neural network based on information in the binary-formatted network traffic activity resource. In some embodiments, the binary-formatted network traffic activity resource is a data file. In some embodiments, the binary-formatted network traffic activity resource is an API message.

In some embodiments, the network traffic projection comprises a traffic projection between the source host and the destination host. In some embodiments, the network traffic projection comprises a traffic projection between at least one of the source host and the destination host and an additional host within N degrees of separation from the at least one of the source host and the destination host. In some embodiments, N is between 1 and 3, inclusive.

In some embodiments, the network traffic projection comprises a total number of bytes transferred between the source host and the destination host for a particular period.

In some embodiments, the network traffic projection comprises a character string, wherein at least some characters in the character string are scaled values representative of a total number of bytes transferred between the source host and the destination host during a particular period. In some embodiments, a domain for each scaled value consists of 1 and 0.

Another set of embodiments relates to a method for network traffic projection and visualization. The method comprises computer-executable operations to receive network traffic data comprising a source host and a destination host, receive change management data comprising at least one of an application associated with one of the source host and the destination host, a planned outage description, and a planned outage duration, generate a neural network comprising a network traffic projection based on the network traffic data, display, via a graphical user interface of a system administrator device, the network traffic projection, receive, via the graphical user interface, a user input indicative of a parameter for the network traffic projection, wherein the parameter includes the change management data, and display, via the graphical user interface, an updated network traffic projection reflective of a subset of network traffic data corresponding to the parameter.

In some embodiments, the graphical user interface comprises a change window simulator. In some embodiments, the method further comprises computer-executable operations to cause the change window simulator to display a set of change windows determined based on the network traffic projection, wherein each change window corresponds to at least one of the source host and the destination host, and, responsive to detecting a user input indicative of the parameter for the network traffic projection, cause the change window simulator to display an updated set of change windows determined based on the network traffic projection and the parameter. In some embodiments, the change window is determined based on at least one of projected number of bytes transferred, projected CPU utilization, and projected memory utilization.

In some embodiments, the method further comprises computer-executable operations to, based on the network traffic data, generate a binary-formatted network traffic activity resource comprising a string of characters indicative of network traffic activity between the source host and the destination host for a particular time period, and generate the neural network based on information in the binary-formatted network traffic activity resource.

Another set of embodiments relates to a method for network traffic projection and visualization. In some embodiments, the method comprises computer-executable operations to receive network traffic data comprising a source host and a destination host, receive change management data comprising at least one of an application associated with one of the source host and the destination host, a planned outage description, and a planned outage duration, generate a network traffic projection based on the network traffic data, display, via a graphical user interface of a system administrator device, the network traffic projection, receive, via the graphical user interface, a user input indicative of a parameter for the network traffic projection, wherein the parameter includes the change management data, and display, via the graphical user interface, an updated network traffic projection reflective of a subset of network traffic data corresponding to the parameter.

In some embodiments, the network traffic projection is generated based on a predetermined number of host pair activity records randomly selected from the network traffic data.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

These and other advantages and features of the invention, together with the organization and manner of operation thereof, will become apparent from the following detailed description when taken in conjunction with the accompanying drawings.

DETAILED DESCRIPTION

Referring to the Figures generally, systems and methods for visualization of network traffic based on historical network traffic and future projection of infrastructure assets are illustrated. In operation, a computing system includes at least one circuit structured to receive network traffic data. A neural network is generated based on the network traffic data and includes a network traffic projection. The network traffic projection is displayed, via a graphical user interface, to a system administrator. In some embodiments, the computing system includes at least one circuit structured to receive change management data, such as application- and outage-related information. The change management data is combined with the network traffic projection data in a change window simulator, which recommends one or more change windows.

Advantageously, the technological processes of the present disclosure provide several technical benefits. For example, network and system administrators are enabled to assess the true impact of actual and/or planned outages on infrastructure components (e.g., infrastructure hardware downtime, application downtime, etc.) Additionally, the systems and methods of the present disclosure enable administrators to assess real-time and projected near-term operation of system interfaces rather than relying on interface documentation regarding interface throughput capacity. Furthermore, the systems and methods of the present disclosure simplify change management activities, such as new releases, patching, and upgrades by providing a sophisticated infrastructure for system downtime planning based on actual network traffic and near-term traffic projections. Further still, the systems and methods of the present disclosure enable administrators to determine potential downstream and upstream impact, within various degrees of separation, of projected near-term system activity.

Figure 1:
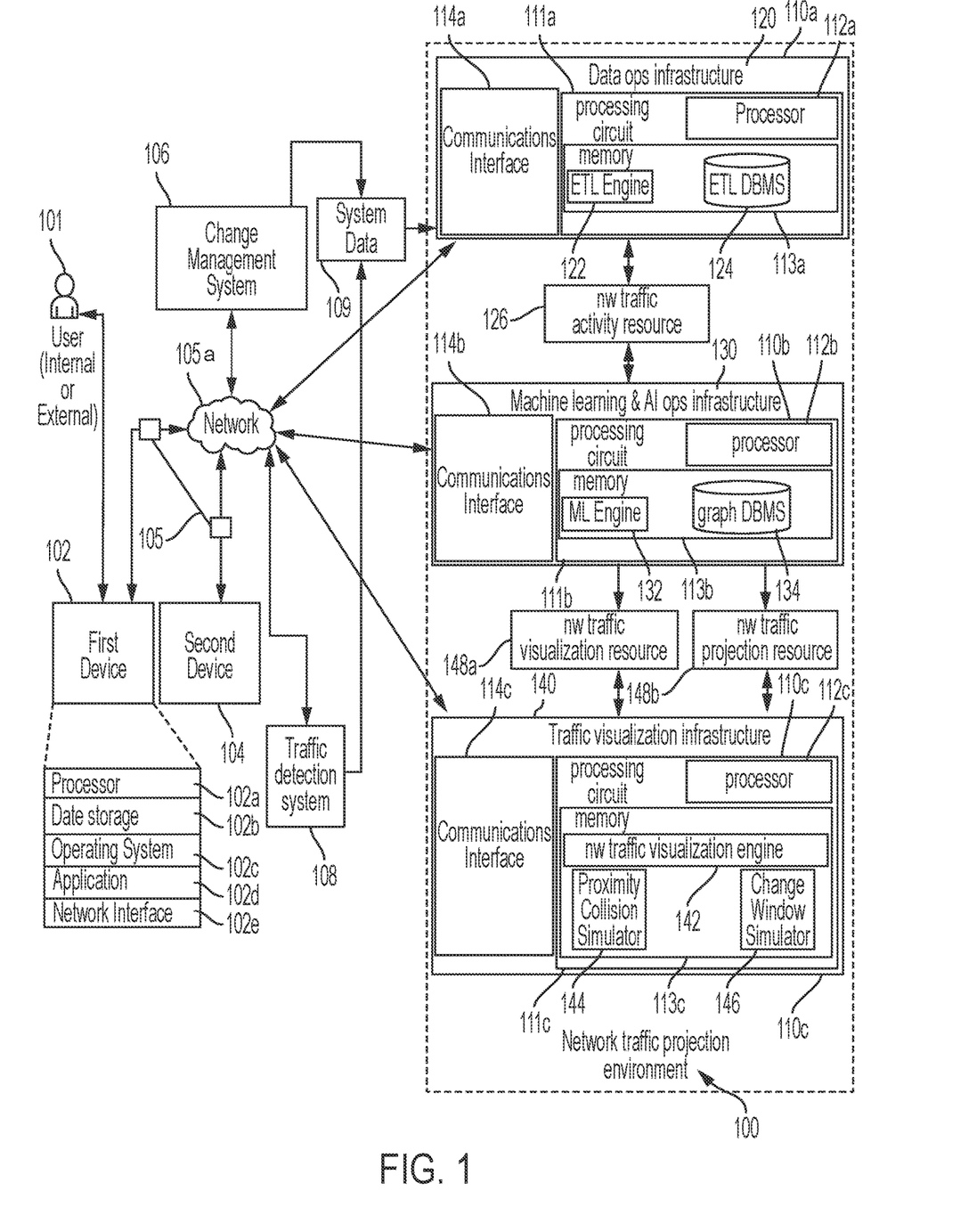
FIG. 1 is a block diagram of an enterprise computing environment for visualization of network traffic based on historical network traffic and future projection of infrastructure assets, according to an example embodiment.

Referring to FIG. 1, a block diagram of an enterprise computing environment for visualization of network traffic based on historical network traffic and future projection of infrastructure assets is shown, according to an example embodiment. As used herein, the terms "environment" and "infrastructure" denote a computing system comprising at least one processor, memory, and at least one circuit, and/or a plurality of communicatively coupled computing systems.

In an example embodiment, the computing environment of FIG. 1 comprises a first device 102, a second device 104, a change management system 106, a traffic detection system 108, and a network traffic projection environment 100. The network traffic projection environment 100 comprises a data operations infrastructure component 120, a machine learning and artificial intelligence (AI) infrastructure component 130, and a traffic visualization infrastructure component 140.

The components of FIG. 1 are communicatively coupled to one another via network 105a. In the example embodiment of FIG. 1, the network 105a includes the Internet. In other arrangements or combinations, the network 105a can include a local area network and/or a wide area network. The operation of the network 105a is facilitated by short and/or long-range communication technologies, such as Bluetooth® transceivers, Bluetooth® beacons, RFID transceivers, NFC transceivers, Wi-Fi transceivers, cellular transceivers, microwave transmitters, software radio, wired network connections (e.g., Ethernet), etc.

In the embodiment of FIG. 1, the network 105a is a packet-switched network, wherein one or more systems shown in FIG. 1 may exchange data using one or more communication protocols, such as a TCP, UDP, SCTP, ICPMv4, ICMPv6, etc. Various components of the environment of FIG. 1 include network (communications) interfaces, such as communications interfaces 114a, 114b, and 114c of the data operations infrastructure component 120, machine learning and AI operations infrastructure component 130, and traffic visualization infrastructure component 140, respectively. According to various implementations, communications interfaces 114a, 114b, and 114c include the hardware and logic necessary to communicate over various channels of data communication. For example, communications interfaces 114a, 114b, and 114c may include one or more of an Ethernet transceiver, a cellular modem, a Bluetooth transceiver, a Bluetooth beacon, an RFID transceiver, and/or an NFC transmitter. Data passing through the communications interfaces 114a, 114b, and 114c may be encrypted such that the communications interfaces 114a, 114b, and 114c are secure communication modules.

As shown, the computing environment of FIG. 1 comprises a first device 102 and a second device 104, which may be communicatively coupled to the network traffic projection environment 100 via the network 105a. The first device 102 and/or the second device 104 originate and/or transmit network traffic in packets 105. In some implementations, the first device 102 and/or the second device 104 may be end-user devices and may comprise any of desktop computers, laptop computers, tablet computers, smart phones, e-readers, set top boxes, game systems, smartwatches, and the like. In some implementations, the first device 102 and/or the second device 104 may be host devices, such as an application server, a database server, a mail server, etc. In yet other implementations, the first device 102 and/or the second device 104 may be networking devices, such as routers, switches, etc. In some embodiments, the first device 102 and/or the second device 104 are part of the enterprise infrastructure of FIG. 1. In some embodiments, first device 102 and/or the second device 104 are external to the enterprise infrastructure of FIG. 1. Although shown in the embodiment of FIG. 1 as singular, stand-alone devices, one of ordinary skill in the art will appreciate that, in some embodiments, the first device 102 and/or the second device 104 may comprise virtualized systems and/or system resources. For example, in some embodiments, the first device 102 and/or the second device 104 may be a virtual switch, virtual router, virtual host, virtual server, etc. In some embodiments, first device 102 and/or the second device 104 may share physical storage, hardware, and other resources with other virtual machines. In some embodiments, virtual resources of the network 105a may include cloud computing resources such that a virtual resource may rely on distributed processing across more than one physical processor, distributed memory, etc.

As used herein, the term "resource" refers to a physical or virtualized (for example, in cloud computing environments) computing resource needed to execute computer-based operations. Examples of computing resources include computing equipment or device (server, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.)

The first device 102 is shown to include a processor 102a, data storage 102b, an operating system 102c, an application 102d, and a network interface 102e. The second device 104 may include similar components (not shown). The data storage 102b may store machine instructions that, when executed by the processor 102a, cause the processor 102a to perform one or more of computer operations. The processor 102a may include one or more microprocessors, application specific integrated circuits (ASICs), field programmable gate arrays (FPGAs), other forms of processing circuits, or combinations thereof. The data storage 102b may include, but is not limited to, electronic, optical, magnetic, or any other storage or transmission device capable of providing the processor 102a with program instructions. The data storage 102b may include storage devices such as a floppy disk, CD-ROM, DVD, magnetic disk, memory chip, ROM, RAM, EEPROM, EPROM, flash memory, optical media, or any other suitable memory from which the processor 102a can read instructions and/or data. The processor 102a and the data storage 102b may form a processing module. The data storage 102b may include files to run an operating system 102c and an application 102d.

The first device 102 and the second device 104 originate and/or transmit traffic to the network traffic projection environment 100 via the network 105a. The term "traffic" generally refers to data communications between the user device 102 and one or more components of the enterprise computing environment shown in FIG. 1, such as the second device 104, and/or one or more of the data operations infrastructure component 120, machine learning and AI operations infrastructure component 130, and/or traffic visualization infrastructure component 140. For example, the first device 102 may submit requests to access various resources (e.g., applications, webpages, services, operating system management-related executables, file system management-related executables, system configuration-related executables, etc.) on a production host within the production environment of FIG. 1. In an example embodiment described herein, the first device 102 is a user device and the second device 104 is a production host, such as an application server, a mail server, etc. The flow of traffic via the network 105a is multi-directional such that the first device 102 may receive return traffic originated by the second device 104. The return traffic to the first device 102 via the network 105a may comprise data responsive to user requests to access the resources on the respective computing system (e.g., on the second device 104).

Network traffic is segmented into packets 105. Each packet 105 is a formatted unit for the data and routing instructions carried via the network 105*a*. As used herein, the term "packet" may refer to formatted units at various levels of the open systems interconnection (OSI) networking and/or TCP/IP models, such that the terms "packet", "segment", "datagram", and "frame" may be used interchangeably. An example packet 105 comprises a header, a footer, and a payload. In some embodiments, packets 105 may also comprise metadata, which may comprise further routing information. For example, in some embodiments, packets 105 may be routed via a software-defined networking switch, which may include in the packet 105 further information (metadata) containing routing information for the software-defined networking environment.

A header, a footer, and/or metadata of a packet 105 may include routing information for the packet 105. As used herein, "routing information" is defined as source and/or destination information. For instance, in some embodiments, packet 105 comprises application-layer level routing information, such as HTTP routing information, TLS routing information, SSL routing information, SMTP routing information, etc. In some embodiments, packet 105 comprises transport and/or internet-link level routing information, such as one or more routing identifiers specific to the TCP, UDP, SCTP, ICPMv4, ICMPv6 protocols, etc. In some embodiments, packet 105 comprises data link-layer routing information, such as a source MAC address, destination MAC address, VLAN ID, VLAN priority, etc. In the embodiment of FIG. 1, each packet 105 also contains a payload (e.g., data carried on behalf of an application) encapsulated with routing information.

An example embodiment of FIG. 1 includes a traffic detection system 108. The traffic detection system 108 is structured to analyze network traffic (e.g., analyze packets 105) and collect various information regarding traffic activity. In some embodiments, the traffic detection system 108 collects packet footer, header, metadata, and/or payload information. For example, the traffic detection system may collect directionality information (e.g., a source address, a destination address, a source port, a destination port, etc.), packet priority information, routing/protocol information, transaction type information, etc. In some embodiments, the traffic detection system 108 may parse a packet 105, which may comprise programmatically breaking down the packet 105 into parts such that only certain characters, values and/or bits are extracted. In some embodiments, the traffic detection system 108 collects further information about packets 105, such as the total number of bytes transmitted for a time period (per minute, per hour, per day, per day of the week, etc.)

An example embodiment of FIG. 1 includes a change management system 106. The change management system 106 is structured to facilitate change management within the enterprise computing environment of FIG. 1. For example, in some embodiments, the change management system 106 may comprise a repository which may list all infrastructure assets, their physical location(s), their identifying information (e.g., MAC address, IP address, port number, etc.), their components, etc. In some embodiments, the change management system 106 may comprise a repository of change activities (e.g., outages), such as patches, new releases, upgrades, their expected duration(s), etc. In some embodiments, the change management system 106 may comprise a cross-reference between infrastructure assets and change activities. In some embodiments, the cross-reference is a data file, a relational map, etc. that may include asset identifying information for upstream systems (e.g., systems from which an asset receives traffic) and/or downstream systems (e.g., systems to which an asset sends traffic). In some embodiments, this cross-reference comprises dynamically generated data (e.g., data generated by one or more components of the network traffic projection environment 100), which may be saved in permanent memory or in transitory memory (e.g., cache) associated with the change management system 106.

In some embodiments, the change management system 106 comprises a graphical user interface structured to allow a system administrator to select an infrastructure asset and schedule a change activity based on the information received from the network traffic projection environment 100. For example, in some embodiments, a change activity may be scheduled when the least amount of disruption is expected to upstream and/or downstream systems. In some embodiments, a disruption factor is generated based on a total number of expected bytes of traffic between two systems (e.g., between a first device 102 and a second device 104) during a particular time window, such that a time window with the lowest number of expected bytes of traffic may be selected based on the disruption factor. In some embodiments, the disruption factor is based on a total number of expected bytes of traffic in a sequential routing path comprised of multiple systems (e.g., a total number of bytes transferred between Host A and Host B as well as a total number of bytes transferred between Host B and host C). In some embodiments, the disruption factor is based on a total number of expected bytes of traffic on parallel routing paths (e.g., a total number of bytes transferred between Host A and Host B as well as a total number of bytes transferred during the same time period between Host C and host D). In some embodiments, routing paths may be assigned different priority levels. For example, traffic for customer-facing applications 102*d* may be assigned a higher priority level than traffic for internal applications. In another example, traffic for particular internal business applications (e.g., financial systems at the end of a fiscal period) may be assigned a higher priority level than traffic for other internal applications. In some embodiments, the priority level is determined based on a port number associated with a particular application. In some embodiments, the priority level is reflected in the disruption factor as a scaling factor such that the total number of bytes in traffic streams of different priority contributes to a different degree to a weighted average of all estimated traffic volumes. In some embodiments, the disruption factor is based on actual or projected CPU utilization, memory utilization, and/or a total number of expected bytes of traffic.

The change management system 106 and/or the traffic detection system 108 generate system data 109, which is transmitted to the data operations infrastructure component 120 within the network traffic projection environment 100. According to various embodiments, system data 109 may include any information described above, such as any of packet header, footer, metadata, and/or payload information for packets 105, and/or change management information, such as infrastructure asset information, change activity information, disruption factor(s), etc. In an example embodiment, the system data 109 includes actual (historical) packet, infrastructure asset, disruption, and/or change management information. According to various embodiments, the system data 109 may include a SQL data set, one or more application programming interface (API) messages, an XML, schema, a text file (e.g., a delimited file), or another suitable resource structured to store and/or transmit formatted data.

In some embodiments, the change management system 106 and/or the traffic detection system 108 include a SQL database that, when queried, provides system data 109 in the form of one or more SQL data sets. In some embodiments, the change management system 106 and the traffic detection system 108 provide data in different formats, such that each of the change management system 106 and/or the traffic detection system 108 generate separate files that include system data 109 for the respective system.

An example embodiment of FIG. 1 includes a network traffic projection environment 100. The network traffic projection environment 100 is structured to perform computer-based operations for visualization of network traffic based on historical network traffic and future projection of infrastructure assets. In the example embodiment of FIG. 1, the network traffic projection environment 100 includes a data operations infrastructure component 120, a machine learning and AI infrastructure component 130, and a traffic visualization infrastructure component 140. The data operations infrastructure component 120 is structured to generate, based on system data 109, a binary-formatted network traffic activity resource 126 in a format that is suitable for performing machine learning and AI operations on the system data 109. The machine learning and AI infrastructure component 130 is structured to identify pairs of hosts (e.g., first device 102 and second device 104) with active connections based on the binary-formatted network traffic resource 126. The traffic visualization infrastructure component 140 is structured to generate computer-based proximity collision simulations and/or change window simulations for managing system outages within the enterprise computing environment of FIG. 1.

According to various embodiments, each or some of the data operations infrastructure component 120, machine learning and AI infrastructure component 130, and/or traffic visualization infrastructure component 140 may comprise a processing circuit (111a, 111b, and 111c, respectively) including a processor (112a, 112b, and 112c, respectively) and memory (113a, 113b, and 113c, respectively). The processing circuit can be communicatively connected to a communications interface (114a, 114b, and 114c, respectively) such that the processing circuit and the various components thereof can send and receive data via the communications interface. The processor (or one or more processors for each respective system) can be implemented as a general purpose processor, an application specific integrated circuit (ASIC), one or more field programmable gate arrays (FPGAs), a group of processing components, or other suitable electronic processing components. The memory (e.g., memory, memory unit, storage device, etc.) can include one or more devices (e.g., RAM, ROM, flash memory, hard disk storage, etc.) for storing data and/or computer code for completing or facilitating the various processes, layers and modules described in the present application. The memory can be or include volatile memory or non-volatile memory. The memory can include database components, object code components, script components, or any other type of information structure for supporting the various activities and information structures described in the present application. According to an example embodiment, the memory is communicatively connected to one or more processors via each system's respective processing circuit and includes code and/or instructions for executing (e.g., by the processor) one or more processes described herein with respect to the data operations infrastructure component 120, machine learning and AI infrastructure component 130, and/or traffic visualization infrastructure component 140.

The data operations infrastructure component 120 is structured to receive network traffic data (e.g., system data 109), receive change management data (e.g., system data 109), perform extract, transform and load (ETL) operations on the data, and generate a binary-formatted network traffic activity resource 126 in a format that is suitable for performing machine learning and AI operations on the data. Memory 113a is shown to include an ETL engine 122 and an ETL database management system (ETL DMBS) 124.

The ETL engine 122 is structured to receive network traffic data and/or change management data (e.g., system data 109) via the communications interface 114a. In some embodiments, the communications interface 114a is a secure communications channel such that the system data 109 is transmitted over TLS, SSL or a similar secured communications protocol. The ETL engine 122 comprises system code that, when executed by the processor 112a, is structured to perform ETL operations on the system data 109 in order to generate the binary-formatted network traffic activity resource 126. For example, in some embodiments, the system data 109 is a text file that includes data received from the traffic detection system 108, where each packet 105 has its own record inclusive of a source host identifier (IP address, MAC address, port information, and the like) and a destination host identifier. The ETL engine 122 is structured to retrieve the system data 109 from the memory 113a (e.g., from the DBMS 124). For example, the ETL engine 122 may be structured to load the system data 109 into a transitory memory, fetch a predetermined number of records from the system data 109 (e.g., 100 records, 1,000 records, 10,000 records, etc.), read each record, extract a source host identifier from each record, extract a destination host identifier from each record, generate a list of unique source host identifier and destination host identifier pairs, and, for each unique host identifier and destination identifier pair, generate a binary activity indicator. In some embodiments, the binary activity indicator is set to 0 if there was no traffic between a host and a destination machine. The binary activity indicator is set to 1 if there was traffic between a host and a destination machine. In some embodiments, the data is broken down by time period, such as by hour within a 24-hour day, such that a series of 24 0s and 1s is generated for each unique host pair.

In some embodiments, the ETL engine 122 is further structured to include additional information for each unique host pair, such as the total number of bytes transferred overall or for a particular time period (e.g., per hour.) The resulting data is written to a file, such as the binary-formatted network traffic activity resource 126. In some embodiments, the ETL engine 122 is structured to save the system data 109 and/or the binary-formatted network traffic activity resource 126 in the DBMS 124. In some embodiments, the ETL engine 122 is structured to combine data from separate system data 109 resources into a single binary-formatted network traffic activity resource 126. In some embodiments, the ETL engine 122 is structured to include in the binary-formatted network traffic activity resource 126 a cross-reference from the change management system 106 between an infrastructure asset (e.g., a source host and/or a target host) and an anticipated change activity, including an anticipated change activity duration. In some embodiments, an API message is generated based on the resulting data instead of or in addition to saving the resulting data.

The machine learning and AI infrastructure component 130 is structured to identify pairs of hosts (e.g., first device 102 and second device 104) with active connections based on the binary-formatted network traffic resource 126. Memory 113b is shown to include a machine learning engine 132 and a graph database management system (graph DMBS) 134.

The machine learning engine 132 is structured to receive the binary-formatted network traffic activity resource 126 via the communications interface 114b. In some embodiments, the communications interface 114b is a secure communications channel such that the binary-formatted network traffic activity resource 126 is transmitted over TLS, SSL or a similar secured communications protocol.

The machine learning engine 132 comprises system code that, when executed by the processor 112b, is structured to identify pairs of hosts (e.g., first device 102 and second device 104) with active connections. In some embodiments, the machine learning engine 132 generates, trains, and updates one or more neural networks, which include nodes and edges (connections). In some embodiments, the nodes in a neural network are infrastructure assets, such as the host device and/or the destination device from the binary-formatted network traffic activity resource 126, and the edges are connections between those assets. In some embodiments, the machine learning engine 132 is structured to generate a plurality of neural networks.

In some embodiments, each neural network includes an input layer. The input layer may comprise a predetermined number of nodes, such as 10, 50, 100, 1000 and so forth. In some embodiments, the nodes for the input layer are randomly selected from the binary-formatted network traffic activity resource 126. In some embodiments, the machine learning engine 132 is structured to train the neural network and periodically update the nodes (e.g., every time a new binary-formatted network traffic activity resource 126 is received, daily, weekly, etc.) In some embodiments, each neural network includes a hidden layer and an output layer. The hidden layer may comprise computer-executable code structured to generate projection data for the output layer. For example, in operation, the machine learning engine 132 may use the neural networks to predict, based on data in the binary-formatted network traffic activity resource 126, when each unique host pair are expected to exchange data next. The criteria for generating a projection may be encoded as computer-executable instructions within the processing logic of the hidden layer of the neural network.

Projection data may include a data record, a data file, etc. In some embodiments, the projection data includes a network traffic visualization resource 148a and/or a network traffic projection resource 148b. In an example embodiment, the network traffic visualization resource 148a is a data file (e.g., text file, XML file, SQL dataset, etc.) that comprises hourly traffic projection data for each host pair for a predetermined time period (e.g., 24 hours, 48 hours, etc.) The network traffic visualization resource 148a may saved in the graph DBMS 134. The graph DBMS 134 may be queried by a graphing application to generate visual representations of projected network activity. In some embodiments, the machine learning engine 132 comprises a time series forecasting engine structured to generate a multi-day binary activity projection file, such as a multi-day network traffic projection resource 148b.

In an example use case, the machine learning engine 132 may recommend an optimal change window. The machine learning engine 132 may determine that the first device 102 and the second device 104 are in active communication twice a day, at 5:00 AM and 5:00 PM, for a batch file upload. The processing logic may specify a minimum threshold number of days with substantially similar activity patterns, such as 1 day, 2 days, one week, a certain number of a particular day of the week, a certain number of a particular calendar date, etc. Based on this information, a projection for an upcoming time period (a 4-hour block, a 12-hour block, a 24-hour block, a 48-hour block, etc.) may be generated. In this use case, if operations of the machine learning engine 132 are executed at 1:00 PM on a particular day, the machine learning engine 132 may predict that the two systems will not be in communication until 5:00 PM and therefore a four-hour change management and downtime window is available for updating one or more of the respective systems without impacting their applications or data interchange processes.

In some embodiments, the network traffic visualization resource 148a and/or the network traffic projection resource 148b comprise, for each host pair, a string of binary character values that includes a set of 1's and 0's for projected network traffic activity for each future time period. The length of each string of binary character values may be determined by the time window for the projection. For example, a data file may include a string of twenty-four 1's and 0's for a 24-hour projection. In some embodiments, the network traffic visualization resource 148a and/or the network traffic projection resource 148b are relationally linked using a source host identifier and a target host identifier for each record. For example, the network traffic projection resource 148b may comprise a string of binary character values for projected network traffic activity, and the network traffic visualization resource 148a may comprise further attributes, such as change management information, infrastructure asset information (e.g., application information), change activity information, disruption factor(s), etc. The additional attributes may be used to determine the extent of the impact of a system outage. In one example use case, although the additional attributes may reveal that a proposed system outage would make an important financial reporting application unavailable during a particular time window, which would increase the impact of the outage, the expected traffic activity for the financial reporting application during a particular hour of the day (e.g., at 6:00 PM) may be a number of times lower than during peak use times (e.g., between 9:00 AM and 6:00 PM), which would mitigate the negative impact of the outage. In some embodiments, the additional attribute data comprises historical CPU utilization and/or memory utilization. In some embodiments, the CPU utilization, memory utilization, and traffic activity (e.g., total bytes of traffic) are combined (e.g., by the ETL engine 122) in a disruption factor. In some embodiments, the disruption factor may be used by the traffic visualization infrastructure component 140 to visually demonstrate the anticipated impact of a planned system outage.

The traffic visualization infrastructure component 140 is structured to perform proximity collision simulation (e.g., to generate a projection of impact of a future change management activity on upstream and/or downstream systems) based on the network traffic visualization resource 148a and/or the network traffic projection resource 148b. In some embodiments, the traffic visualization infrastructure component 140 is structured to determine one or more optimal change management windows based on the network traffic visualization resource 148a and/or the network traffic projection resource 148b. Accordingly, the memory 113c is shown to include a network traffic visualization engine 142, which includes a proximity collision simulator 144 and a change window simulator 146. In the example embodiment, each simulator is a computing circuit.

The proximity collision simulator 144 is structured to generate a projection and/or visualize downstream impact of a proposed change activity. In some embodiments, the proximity collision simulator 144 is structured to predict the impact of a proposed change activity within one degree of separation from a host in a host pair. For example, if a host pair in a record from a network traffic visualization resource 148a and/or a network traffic projection resource 148b includes a source host (e.g., a first device 102) and a destination host (e.g., a second device 104), the proximity collision simulator 144 may be structured to traverse the network traffic visualization resource 148a and/or a network traffic projection resource 148b to identify records where the destination host is a source host. The proximity collision simulator 144 may be structured to determine additional downstream systems (e.g., additional destination hosts) based on whether any network traffic is projected, for a pre-defined time period, for each additional pair, where the destination host from the original record is a source host. In some embodiments, the proximity collision simulator 144 is structured to predict the impact of a proposed change activity within two or three degrees of separation from a host in a host pair. In some embodiments, a confidence interval is associated with each downstream projection. The projections generated by the proximity collision simulator 144 may be visualized in the form of a graph, network diagram, or another suitable graphical representation via a user interface of a computing device used by a system administrator to estimate the impact of a proposed change activity.

The change window simulator 146 is structured to generate a recommended set of one or more timed change windows for a proposed system change based on the data in the network traffic visualization resource 148a and/or a network traffic projection resource 148b. In some embodiments, the change window simulator 146 comprises executable code structured to query the change management system 106 for change tickets for a predetermined prospective time window (e.g., 3 days, 7 days, 30 days, etc.) The change window simulator 146 is structured to identify a host system (e.g., a first device 102) from each prospective change ticket. For each host system, the change window simulator 146 is structured to query and/or parse the network traffic visualization resource 148a and/or a network traffic projection resource 148b to identify records where the host device from the change ticket is a source device or a destination device. For reach host system, the change window simulator 146 is structured to identify corresponding records in the host pair and extract the corresponding string of binary characters. Each of the binary characters corresponds to projected network traffic for a particular time period (e.g., an hour of a 24-hour day). Based on this information, the change window simulator 146 is structured to generate a recommended set of change windows where network traffic is not predicted to occur (that is, where the value for a particular time slot within the string of binary characters is 0) or when network traffic is minimized (e.g., according to a threshold number of bytes transferred).

In some embodiments, the change window simulator 146 is structured to access data (e.g., system data 109, network traffic activity resource 126, network traffic visualization resource 148a, network traffic projection resource 148b, etc.) that provides additional attributes to quantify the impact of an outage. The additional attributes may include infrastructure asset information (e.g., application information), change activity information (patch, upgrade, etc.), and/or disruption factor(s). These attributes may be visually represented in the form of a graph, chart, etc. In some embodiments, predicted impact of an outage is shown on a slider bar. A user may interact with the slider bar to adjust the threshold(s) for a particular outage (e.g., to adjust the thresholds for a total number of bytes transferred, CPU utilization, memory utilization, disruption factors), and the change window simulator 146 may modify the set of recommended change windows according to user-entered parameters.

According to various embodiments, communications among various components of the network traffic projection environment 100 may be carried out using one or more application programming interfaces (API). APIs may be structured to encode, decode, receive, and transmit the various data items (e.g., messages) included in the data streams exchanged between these infrastructure components. According to various embodiments, APIs can be implemented as software code suitable for compilation, object code, executable file(s) and/or code, and/or in another suitable form for carrying out the computer-implemented method(s) described herein. In some embodiments, APIs may be configured to specify an appropriate communication protocol using a suitable data interchange format, including any of a SQL data set, a protocol buffer message stream, an instantiated class implemented in a suitable object-oriented programming language (e.g., Python, Java, Ruby, C#, etc.), an XML item, a web service message in a suitable message format (e.g., representational state transfer (REST), simple object access protocol (SOAP), web service definition language (WSDL), JavaScript object notation (JSON), XML remote procedure call (XML RPC), etc.). Further, in some embodiments, the APIs may be installed on or configured to call executable functions residing on one or more web service node(s) (not shown). These executable functions can be structured to encode, decode, send and receive REST messages, SOAP messages, WSDL messages, JSON messages, XML RPC messages, etc.

Figure 2:
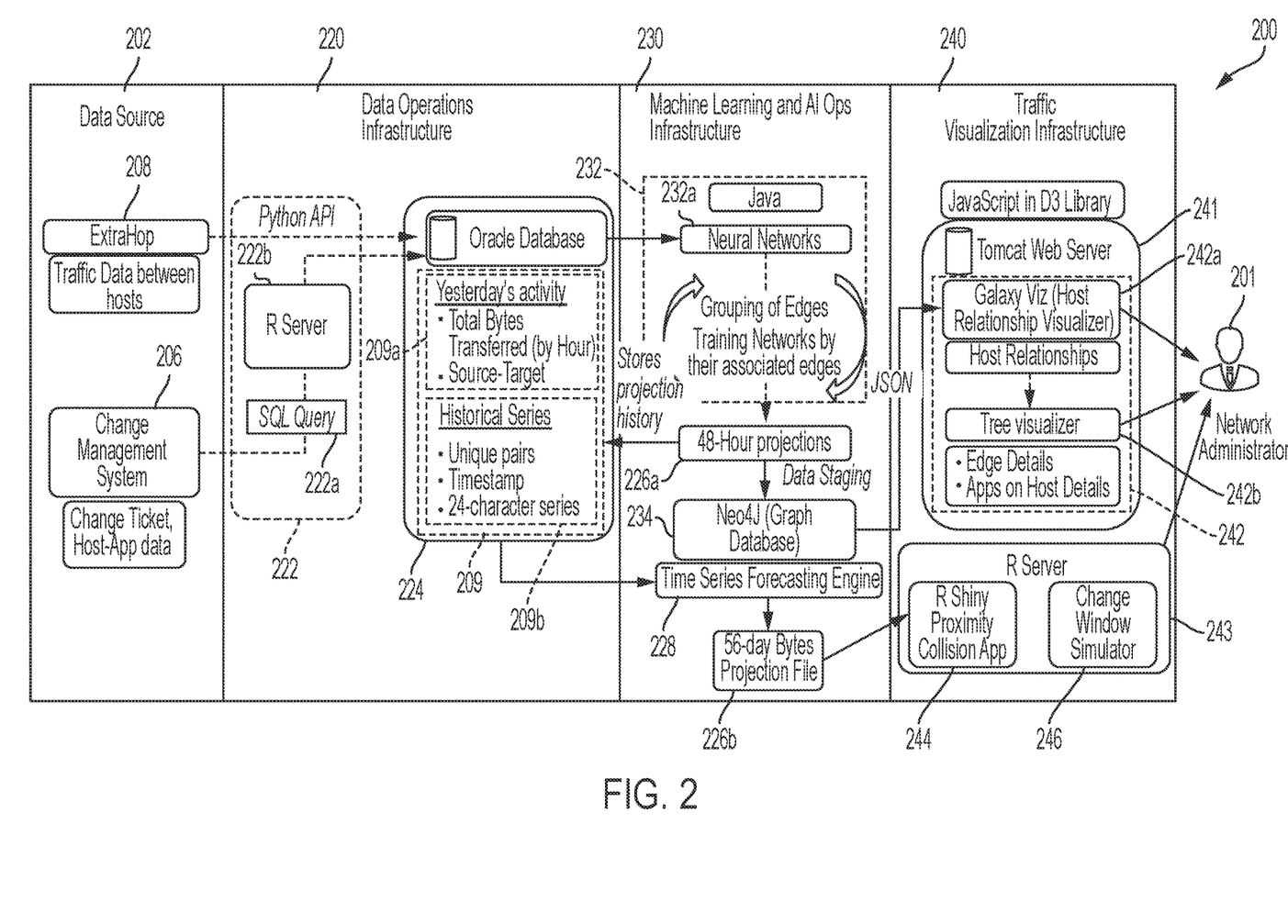
FIG. 2 is a block diagram of a network traffic projection environment, according to an example embodiment.

Referring to FIG. 2, a block diagram of a network traffic projection environment 200 is shown, according to an example embodiment. The network traffic projection environment 200 comprises a data source 202, a data operations infrastructure component 220, a machine learning and AI operations infrastructure component 230, and a traffic visualization infrastructure component 240. In operation, the systems and circuits of FIG. 2 are structured to receive network data and change management data, perform ETL on the network and change management data, and generate a network traffic activity resource. The systems of FIG. 2 are further structured to identify pairs of hosts with active connections, visualize host relationships, and visualize edge (connection) details. The systems of FIG. 2 are further structured to extract historical series data from the network activity resource, generate a network traffic projection based on historical series data, project downstream impact of a system outage, and determine one or more change management windows.

The data source 202 may include one or more data sources. As shown, the data source 202 includes a change management system 206. The change management system 206 is structured to generate and provide change management data to the systems of the data operations infrastructure 200. As shown, the data source 202 also includes a traffic detection system 208. In the example embodiment, Extra-Hop is used to detect and manage network traffic, however, one of skill in the art will appreciate that other suitable systems may be used. The traffic detection system 208 is structured to monitor network traffic between hosts and send network traffic data to the systems of the data operations infrastructure 200.

The data source 202 collects and sends network traffic data and change management data to the data operations infrastructure component 220 via the API 222. In an example embodiment, the API 222 includes one or more SQL queries 222a and an R server 222b. In the example embodiment, the API 222 is structured to cause an execution of a first set of SQL queries along with one or more executable code packages (e.g., ETL packages written in Python) to receive and load change management data from the change management system 206 into a staging database 224 (e.g., Oracle). The API 222 is also structured to cause an execution of a second set of SQL queries to receive and load network traffic data from the traffic detection system 208 into the staging database 224.

The staging database 224 comprises one or more data stores (e.g., relational tables, views, and the like) structured to store the data received via the API 222. As shown according to an example embodiment, the one or more data stores are structured to generate a system data set 209. According to various embodiments, the system data set 209 may comprise change management data and/or network traffic data. As shown, in structure and operation, the system data set 209 corresponds to the network traffic activity resource 126 of FIG. 1.

As shown, the system data set 209 comprises network traffic data. The network traffic data comprises a yesterday's activity data set 209a and a historical series data set 209b. In an example embodiment, the staging database 224 is populated nightly, in an incremental fashion (that is, with data for previous day's activity) such that a new yesterday's activity data set 209a is generated nightly. According the various embodiments, the staging database 224 may be populated in real time or in near real time (e.g., as network traffic is detected), every five minutes, every ten minutes, hourly, etc. In the example embodiment, the historical series data set 209b is stored continuously in the stating database and may be updated nightly, weekly, or according to a predetermined schedule.

As shown, the yesterday's activity data set 209a includes information regarding a host pair, the total number of bytes transferred between the hosts in the pair, and total bytes transferred by hour. In some embodiments, the yesterday's activity data set 209a is a delimited file, a SQL data set or the like. In some embodiments, all or a part of each record in yesterday's activity data set 209a has a fixed length. For example, in the embodiment of FIG. 3, at least a part of each record is a character string of twenty-four binary values that denote network traffic activity for each hour of a twenty-four hour day.

The machine learning and AI operations infrastructure component 230 includes a machine learning engine 232 and a graph database 234. In an example embodiment, the machine learning engine 232 includes executable code packages written in Java. The executable code packages contain instructions that, when executed by a processor, cause the machine learning engine 232 to generate one or more neural networks 232a. The one or more neural networks 232a are structured to read an input file (e.g., yesterday's activity data set 209a) received from the data operations infrastructure component 220 and, based on the input file, generate and/or update one or more network traffic projections for a predetermined time period. The one or more traffic projections may comprise pairs of hosts with projected active connections. In some embodiments, active connections are projected by hour. For example, as shown, the Java-based neural network 232a is structured to generate a projection data file 226a (e.g., a text file, a delimited file, an XML file, etc.) that includes hourly traffic projections by host pair for the next 48 hours.

In an example embodiment, the Java-based neural network 232a is structured to cause a transmission of the projection data file 226a to the staging database 224 for storage in the historical series data set 209b. In some embodiments, the Java-based neural network 232a is structured to subsequently cause a retrieval of data from the historical series data set 209b and compare the projections to actual data received in an updated yesterday's activity data set 209a. In some embodiments, a projection accuracy threshold is assigned to each projection. In some embodiments, the projection accuracy threshold varies according to how far out projections are made. For instance, the projection accuracy threshold may be 95% for near-term (4-hour, 6-hour, 12-hour projections), 90% for medium-term (12- to 24-hour projections), and 80% for other projections. In an example embodiment, the projection accuracy threshold is set uniformly at 95% for 48-hour projections.

The graph database 234 stores the data from the projection data file 226a. In some embodiments, the graph database 234 comprises or is coupled to an application that includes computer-executable code structured to provide a graphical representation of projected network traffic based on data in the projection data file 226a. In some embodiments, the graph database 234 is Neo4j, although another suitable graph DMBS may be used.

The traffic visualization infrastructure component 240 comprises a web server 241, which hosts a network traffic visualization engine 242. The web server 241 is structured to receive a JSON data feed from the graph database 234. The JSON data feed comprises network projection data, such as host pairs, projected network traffic, projected total bytes transferred, etc. According to various embodiments, the JSON data feed may be received in near real-time, every minute, every 5 minutes, every 15 minutes, every 30 minutes, hourly, etc. In some embodiments, the network projection data may comprise supplemental attributes, such as change management information, infrastructure asset information (e.g., application information), change activity information, disruption factor(s), etc. The additional attributes may be used by the traffic visualization infrastructure component 240 to determine the extent of the impact of a system outage as described in reference to FIG. 1. In some embodiments, the additional attributes are searchable such that a user may specify parameters for visualizing a subset of projected information.

As shown, the network traffic visualization engine 242 includes a host relationship visualizer application 242a, which may comprise a tree visualizer 242b. In the embodiment of FIG. 2, the host relationship visualizer application 242a is communicatively coupled to the graph database 234 and receives a JSON data feed therefrom. The host relationship visualizer application 242a comprises computer-executable code coupled to one or more graphical user interfaces. According to various embodiments, the host relationship visualizer application 242a comprises one or more graphical user interfaces structured to visualize host relationships (e.g., distance in terms of links or hops between a pair of hosts) in the form of a network diagram or in another suitable format. In some embodiments, the one or more graphical user interfaces comprise an interface control (e.g., a drop-down box, a search box, etc.) that allows a user to specify a host (e.g., using a MAC address, IP address, computer application associated with a host, etc.), a pair of hosts, hosts that meet a minimum threshold of network traffic in bytes or as a scaled value, time-based restrictions (e.g., hour of the day, time of the day, etc.), and so forth. The host relationship visualizer application 242*a* further comprises computer-executable code that is structured to modify the graphical representation of projected network traffic according to user-entered parameters. In some embodiments, the host relationship visualizer application 242*a* comprises a tree visualizer 242*b*, which includes computer-executable code structured to cause the network traffic visualization engine 242 to display, via a graphical user interface, a subset of network traffic projection data in a tree format. In some embodiments, the tree visualizer 242*b* is structured to provide information regarding edge (connection) details for each host pair, such as details about production applications that run on a particular host from a host pair.

As shown, the traffic visualization infrastructure component 240 further comprises an R server 243, which hosts a proximity collision simulator 244 and a change window simulator 246. These components are structured to operate similarly to those described in reference to FIG. 1.

Figure 3:
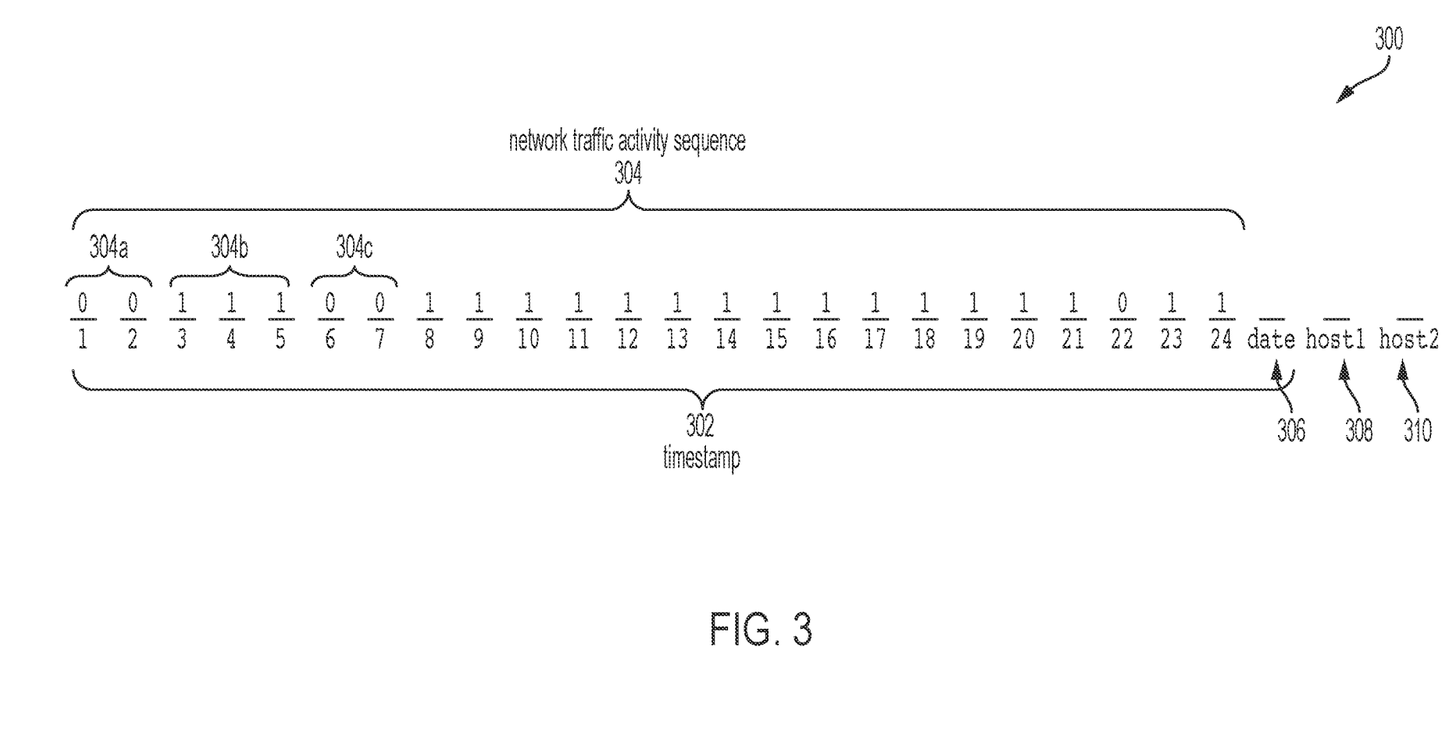
FIG. 3 is a schematic representation of an example network traffic activity resource created according to aspects of operation of example systems of FIG. 1 and FIG. 2, according to an example embodiment.

Referring to FIG. 3, a schematic representation of an example network traffic activity resource 300 is shown, according to an example embodiment. The network traffic activity resource 300 includes data in a format that is suitable for performing machine learning and AI operations on the data. According to various embodiments, the network traffic activity resource 300 can be a text file, an XML file, an API message, etc. The network traffic activity resource 300 may include one or more records. In some embodiments, the network traffic activity resource 300 includes actual (historical) data received by the machine learning and AI operations infrastructures of FIG. 1 and/or FIG. 2, and neural network analysis is performed on this data. In some embodiments, the machine learning and AI operations infrastructures of FIG. 1 and/or FIG. 2 generate projection data files (e.g., a network traffic visualization resource 148*a*, a network traffic projection resource 148*b*, a projection data file 226*a*, an API message from the graph database 234). These projection data files may be similar in structure to the network traffic activity resource 300, but actual values may be replaced with projected values.

As shown, the network traffic activity resource 300 includes a network traffic activity sequence 304. In the example embodiment, the network traffic activity sequence 304 is a fixed-length character string of binary values. In other embodiments, the network traffic activity sequence 304 may be a string of delimited and/or concatenated numerical values. For example, the network traffic activity sequence 304 may include a total number of bytes transferred for each time slot.

As shown, the network traffic activity sequence 304 includes a timestamp 302. The timestamp 302 includes twenty-four characters positions, each representative of an hour-long period of a particular day. Each character position is set to a 0 if no network traffic was detected, and to a 1 if network traffic was detected. For example, as shown according to segments 304*a*, 304*b*, and 304*c*, no traffic was detected between 0:00 AM and 2:00 AM or between 5:00 AM and 7:00 AM. Traffic was detected between 2:00 AM and 5:00 AM. The timestamp 302 further includes a date 306. In an example embodiment, the date 306 is an actual historical date. However, in embodiments where the network traffic activity resource 300 includes projected data, the date 306 may be a projected future date.

As shown, the network traffic activity resource 300 includes a first host identifier 308 and a second host identifier 310. The first host identifier 308 represents a source host (e.g., a machine that originated or transmitted network traffic). The second host identifier 310 represents a target host (e.g., a machine that received network traffic.) According to various embodiments, host identifiers may comprise a VLAN id, an IP address, a MAC address, a port number, other suitable identifiers, and/or a combination thereof. In some embodiments, the network traffic activity resource 300 may further include supplemental information, such as change management information, infrastructure asset information (e.g., application information), change activity information, disruption factor(s), etc.

Figure 4:
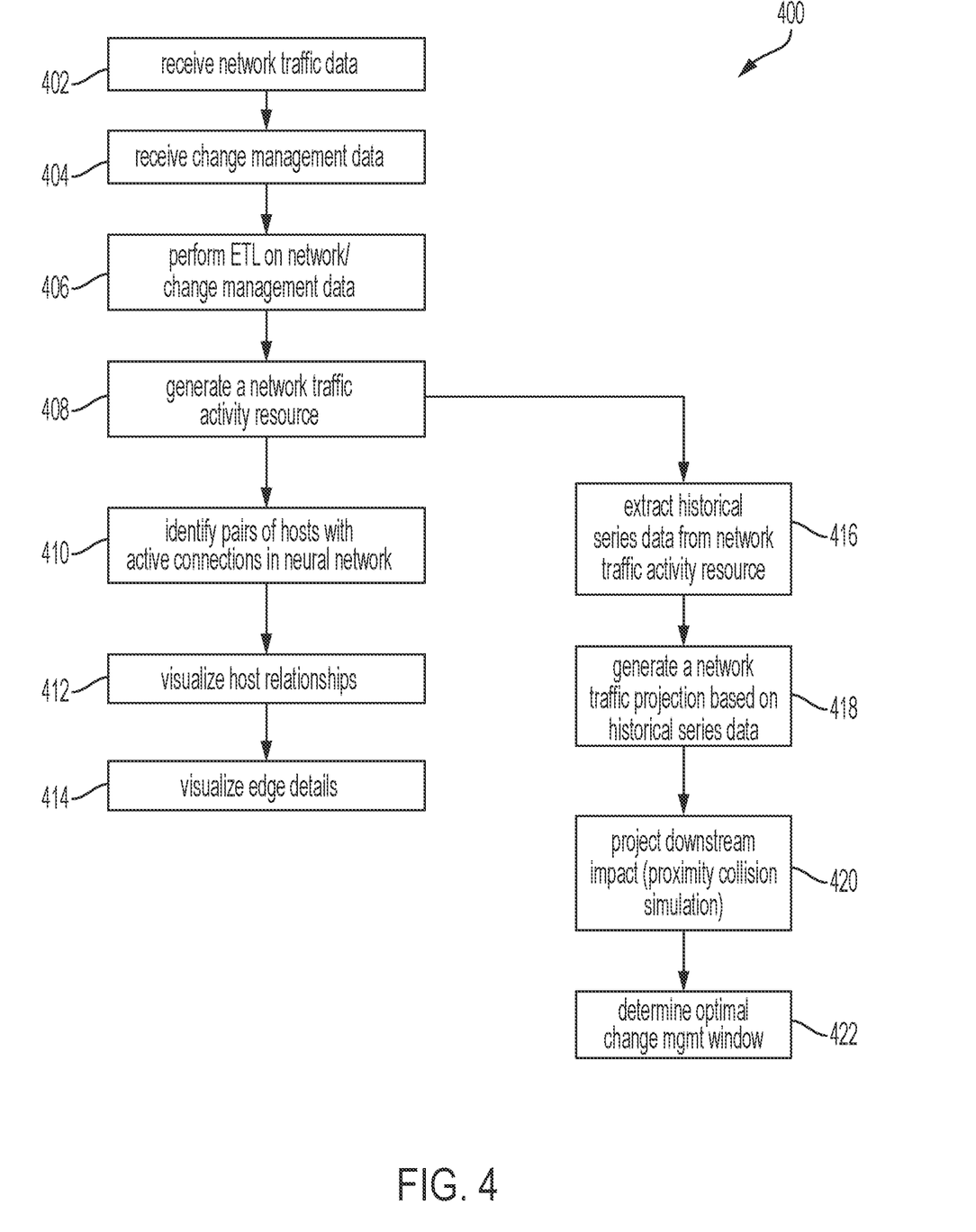
FIG. 4 is a flow diagram including computer-based operations for visualization of network traffic based on historical network traffic and future projection of infrastructure assets, according to an example embodiment.

Referring to FIG. 4, a flow diagram for a method 400 is shown, according to an example embodiment. The method 400 includes operations for visualization of network traffic based on historical network traffic and future projection of infrastructure assets, according to an example embodiment.

The operations of method 400 may include receiving network traffic data (at 402) and/or change management data (at 404). The network traffic data may include any suitable data from or associated with a data packet, such as any data from a header, a footer, metadata, and/or a payload of a packet. Some examples of network traffic data include HTTP routing information, TLS routing information, SSL routing information, SMTP routing information, one or more routing identifiers specific to the TCP, UDP, SCTP, ICPMv4, ICMPv6 protocols, an IP address, and/or data link-layer routing information, such as a MAC address, VLAN ID, VLAN priority, port number, etc. The network traffic data may include host identifiers for a source host and a destination host. Change management data may include information from a change management system, such as host information, application information, outage information, outage duration, etc.

The operations of method 400 may include performing ETL on the network and/or change management data (at 406) and generating a network traffic activity resource (at 408). In some embodiments, the network traffic activity resource is a data file. In some embodiments, the network traffic activity resource is an API message. In an example embodiment, the method 400 includes causing an ETL engine to load the received data into memory, fetch a predetermined number of records from the data (e.g., 100 records, 1,000 records, 10,000 records, etc.), read each record, extract a source host identifier from each record, extract a destination host identifier from each record, generate a list of unique source host identifier and destination host identifier pairs, and, for each unique host identifier and destination identifier pair, generate a binary activity indicator. In some embodiments, the binary activity indicator is set to 0 if there was no traffic between a host and a destination machine. The binary activity indicator is set to 1 if there was traffic between a host and a destination machine. In some embodiments, the data is broken down by time period, such as by hour within a 24-hour day, such that a series of 24 0s and 1s is generated for each unique host pair. The binary activity indicator may be included in the network traffic activity resource, as shown, for example, in FIG. 3.

The operations of method 400 may include using or generating a neural network (at 410) to identify, based on the network traffic activity resource, host pairs that had and/or are projected to have active connections for a pre-determined time period (e.g., 24 hours, 48 hours, etc.) In some embodiments, a predetermined number of hosts are randomly selected from the network traffic activity resource for inclusion in the neural network. In some embodiments, the neural network comprises a data translation/projection layer that may include computer-executable instructions for generating projections of pairs on hosts that are expected to have network traffic in a specified time period. In some embodiments, a confidence interval is associated with each projection record and/or with each projected value for each time period. In some embodiments, the confidence interval is adjusted based on how far out projections are made.

The operations of method 400 may include visualizing host relationships (at 412) and, further, visualizing connection details between hosts (at 414.) In an example embodiment, a projection generated at 410 is saved in a database, such as a graph database, and/or is sent via an API (e.g., as a JSON message) to a host relationship visualizer application. An example host relationship visualizer application may include one or more graphical user interfaces structured to visualize host relationships (e.g., distance in terms of links or hops between a pair of hosts) in the form of a network diagram or in another suitable format. In some embodiments, one or more graphical user interfaces comprise an interface control (e.g., a drop-down box, a search box, etc.) that allows a user to specify a host (e.g., using a MAC address, IP address, computer application associated with a host, etc.), a pair of hosts, hosts that meet a minimum threshold of network traffic in bytes or as a scaled value, time-based restrictions (e.g., hour of the day, time of the day, etc.), and so forth. The host relationship visualizer application further may be programmed to modify the graphical representation of projected network traffic according to user-entered parameters. In some embodiments, the host relationship visualizer application may include a tree visualizer, which may be programmed to display, via a graphical user interface, a subset of network traffic projection data in a tree format. In some embodiments, the tree visualizer may provide additional information regarding edge (connection) details for each host pair, such as details about production applications that run on a particular host from a host pair.

The operations of method 400 may include accessing historical traffic data (at 416) and generating a long-term (e.g., multi-day, 7-day, 30-day, etc.) traffic projection based on the historical traffic data (at 418). In some embodiments, the historical series data (e.g., data from each network traffic activity resource) and/or traffic projections are saved in a DBMS such that data remains accessible over a long-term period. In some embodiments, the method 400 may include causing a time series forecasting circuit (engine) to generate a long-term network activity projection based on the historical traffic data. In some embodiments, operations 416 and 418 are omitted.

The operations of method 400 may include generating a downstream impact projection for a planned change request (at 420) and/or generating a set of one or more change management windows (at 422).

In some embodiments, method 400 comprises causing a proximity collision simulator application to generate a downstream impact projection for a source host and/or a destination host from a network traffic activity resource. For example, the proximity collision simulator may be programmed to traverse a data file to identify a particular host. The proximity collision simulator may be programmed to determine additional downstream systems for the host (e.g., additional destination hosts) based on whether any network traffic is projected that involves the host. In some embodiments, the proximity collision simulator is programmed to predict the impact of a proposed change activity within one, two or three degrees of separation from a host. In some embodiments, a confidence interval is associated with each downstream projection.

In some embodiments, method 400 comprises causing a change window simulator to generate a recommended set of timed change windows for a proposed system change based on the projections generated at 410. In some embodiments, the change window simulator is programmed to identify for change tickets for a predetermined prospective time window (e.g., 3 days, 7 days, 30 days, etc.) The change window simulator is programmed to identify a host system from each prospective change ticket. For each host system, the change window simulator is programmed to identify predicted traffic flows. Based on this information, the change window simulator is programmed to generate a recommended set of change windows where network traffic is not predicted to occur or when network traffic is minimized (e.g., according to a threshold number of bytes transferred).

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" (e.g., "engine") may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A network traffic projection and visualization computing system, the system comprising at least one processor and memory, the memory comprising computer-executable instructions, the instructions, when executed by the at least one processor, operable to:
    based on network traffic data, determine at least one host identifier pair comprising a source host and a destination host;
    receive change management data relating to at least one of the source host and the destination host;
    generate a neural network comprising a network traffic projection for the at least one of the source host and the destination host; and
    based on the generated neural network comprising the network traffic projection and the received change management data, determine projected traffic activity between at least one other computing entity and the at least one of the source host and the destination host.

2. The system of claim 1, the change management data being related to an application associated with the at least one of the source host and the destination host.

3. The system of claim 1, the change management data comprising information regarding an outage of an application.

4. The system of claim 3, the memory further comprising the computer-executable instructions that, when executed by the at least one processor, are operable to:
    determine impact of a subset of the change management data associated with the at least one of the source host and the destination host, wherein the determined impact is based on at least one of a total number of bytes of traffic between the at least one of the source host and the destination host, CPU utilization of the at least one of the source host and the destination host, memory utilization of the at least one of the source host and the destination host, and the determined projected traffic activity.

5. The system of claim 4, the memory further comprising the computer-executable instructions that, when executed by the at least one processor, are operable to:
based on the determined impact, determine, using the generated neural network, an optimal routing path for traffic associated with the application.

6. The system of claim 1, the memory further comprising the computer-executable instructions that, when executed by the at least one processor, are operable to:
generate, on a display of a user device, a change window simulator comprising the determined projected traffic activity; and
cause the change window simulator to display a set of change windows determined based on the network traffic projection, wherein each of the change windows of the set of determined change windows corresponds to the at least one of the source host and the destination host.

7. The system of claim 1, the memory further comprising the computer-executable instructions that, when executed by the at least one processor, are operable to:
based on the network traffic data, generate a network traffic activity resource indicative of network traffic activity between the at least one of the source host and the destination host for a particular time period; and
generate the neural network based on information in the network traffic activity resource;
wherein the network traffic activity resource is one of a data file and an API message.

8. A method implemented by a network traffic projection and visualization computing system, the method comprising:
based on network traffic data, determining at least one host identifier pair comprising a source host and a destination host;
receiving change management data relating to at least one of the source host and the destination host;
generating a neural network comprising a network traffic projection for the at least one of the source host and the destination host; and
based on the generated neural network comprising the network traffic projection and the received change management data, determining projected traffic activity between at least one other computing entity and the at least one of the source host and the destination host.

9. The method of claim 8, the change management data being related to an application associated with the at least one of the source host and the destination host.

10. The method of claim 8, the change management data comprising information regarding an outage of an application.

11. The method of claim 10, further comprising:
determining impact of a subset of the change management data associated with the at least one of the source host and the destination host, wherein the determined impact is based on at least one of a total number of bytes of traffic between the at least one of the source host and the destination host, CPU utilization of the at least one of the source host and the destination host, memory utilization of the at least one of the source host and the destination host, and the determined projected traffic activity.

12. The method of claim 11, further comprising:
based on the determined impact, determining, using the generated neural network, an optimal routing path for traffic associated with the application.

13. The method of claim 8, further comprising:
generating, on a display of a user device, a change window simulator comprising the determined projected traffic activity; and
causing the change window simulator to display a set of change windows determined based on the network traffic projection, wherein each of the change windows of the set of determined change windows corresponds to the at least one of the source host and the destination host.

14. The method of claim 8, further comprising:
based on the network traffic data, generating a network traffic activity resource indicative of network traffic activity between the at least one of the source host and the destination host for a particular time period; and
generating the neural network based on information in the network traffic activity resource;
wherein the network traffic activity resource is one of a data file and an API message.

15. One or more non-transitory computer-readable media having computer-executable instructions stored thereon, the instructions, when executed by at least one processor of a network traffic projection and visualization computing system, causing the computing system to perform operations comprising:
based on network traffic data, determining at least one host identifier pair comprising a source host and a destination host;
receiving change management data relating to at least one of the source host and the destination host;
generating a neural network comprising a network traffic projection for the at least one of the source host and the destination host; and
based on the generated neural network comprising the network traffic projection and the received change management data, determining projected traffic activity between at least one other computing entity and the at least one of the source host and the destination host.

16. The media of claim 15, the change management data being related to an application associated with the at least one of the source host and the destination host.

17. The media of claim 15, the change management data comprising information regarding an outage of an application.

18. The media of claim 17, the operations further comprising:
determining impact of a subset of the change management data associated with the at least one of the source host and the destination host, wherein the determined impact is based on at least one of a total number of bytes of traffic between the at least one of the source host and the destination host, CPU utilization of the at least one of the source host and the destination host, memory utilization of the at least one of the source host and the destination host, and the determined projected traffic activity.

19. The media of claim 18, the operations further comprising:
based on the determined impact, determining, using the generated neural network, an optimal routing path for traffic associated with the application.

20. The media of claim 15, the operations further comprising:
generating, on a display of a user device, a change window simulator comprising the determined projected traffic activity; and causing the change window simulator to display a set of change windows determined based on the network traffic projection, wherein each of the change windows of the set of determined change windows corresponds to the at least one of the source host and the destination host.

\* \* \* \* \*